United States Patent
Clayson et al.

(10) Patent No.: US 7,788,035 B2
(45) Date of Patent: Aug. 31, 2010

(54) SYSTEMS AND METHODS FOR DETERMINING TURBULENCE AND TURBULENT MIXING IN THE FREE ATMOSPHERE

(75) Inventors: Carol Anne Clayson, Tallahassee, FL (US); Lakshmi Kantha, Louisville, CO (US)

(73) Assignee: Florida State University Research Foundation, Tallahassee, FL (US)

( * ) Notice: Subject to any disclaimer, the term of this patent is extended or adjusted under 35 U.S.C. 154(b) by 255 days.

(21) Appl. No.: 11/971,814

(22) Filed: Jan. 9, 2008

(65) Prior Publication Data

US 2008/0177474 A1     Jul. 24, 2008

Related U.S. Application Data

(60) Provisional application No. 60/884,104, filed on Jan. 9, 2007.

(51) Int. Cl.
*G01W 1/02* (2006.01)
(52) U.S. Cl. .................... 702/3; 702/130; 702/179
(58) Field of Classification Search ............... 702/1–3, 702/130, 179; 73/170.16, 170.28; 374/136, 374/137
See application file for complete search history.

(56) References Cited

U.S. PATENT DOCUMENTS

| | | | |
|---|---|---|---|
| 5,523,759 A * | 6/1996 | Gillberg et al. | 342/26 B |
| 6,237,405 B1 * | 5/2001 | Leslie | 73/170.07 |
| 7,598,901 B2 * | 10/2009 | Tillotson et al. | 342/26 B |
| 2008/0072669 A1 * | 3/2008 | Paukkunen | 73/335.02 |

OTHER PUBLICATIONS

Lorke et al., Probability density of displacement and overturning length scales under diverse stratification, Dec. 2002, Journal of Geophysical Research, vol. 107, pp. 1-11.*
Cimini et al., Temperature and humidity profile retrievals from ground-based microwave radiometers during TUC, Feb. 2006, Meteorologische Zeitschrift, vol. 15, pp. 46-56.*
Corner et al., A New Radiosonde System for Profiling the Lower Troposphere, Oct. 1998, Journal of Atmospheric and Oceanic Technology, vol. 16, pp. 828-836.*
Yamanaka et al.,"Inertio-gravity waves and subtropical multiple tropopauses: Vertical wavenumber spectra of wind and temperature observed by the MU radar, radiosondes and operational rawinsonde network", 1996, Journal of Atmosphere and Terrestrial Physics, vol. 58, pp. 785-805.*

* cited by examiner

*Primary Examiner*—Carol S Tsai
*Assistant Examiner*—Ricky Ngon
(74) *Attorney, Agent, or Firm*—Sutherland Asbill & Brennan LLP

(57) ABSTRACT

Systems may methods may be provided for determining turbulent mixing characteristics. The systems and methods may include obtaining sounding data associated with an atmospheric column and determining first vertical potential temperature profiles from the sounding data. The systems and methods may further include determining second vertical profiles of displacement scales based at least in part on the first vertical potential temperature profiles, and determining turbulent mixing characteristics in the atmospheric column based at least in part on the displacement scales.

20 Claims, 2 Drawing Sheets

SYSTEMS AND METHODS FOR DETERMINING TURBULENCE AND TURBULENT MIXING IN THE FREE ATMOSPHERE

RELATED APPLICATION

This application claims priority to U.S. Provisional Application Ser. No. 60/884,104, filed Jan. 9, 2007, and entitled "Systems and Methods for Determining Turbulence and Turbulent Mixing in the Free Atmosphere," which is hereby incorporated by reference in its entirety as if fully set forth herein.

BACKGROUND OF THE INVENTION

Mixing in the free atmosphere above the atmospheric boundary layer (ABL) and the deep ocean below the oceanic mixed layer (OML) has been a tough problem to solve since it is episodic and hard to model using second moment closure. The generation mechanisms in these generally stably stratified regions are not as well understood. The current consensus is that the mixing in the deep ocean is mainly internal wave-driven, although in many places double-diffusion is also important. In the free atmosphere, mixing may be driven by mean shear and associated shear instabilities as well as internal wave breaking.

Mixing caused by the jetstream at the tropopause and mountain waves breaking near the tropopause are potentially important in the exchange of trace gases such as ozone and greenhouse gases such as carbon dioxide between the troposphere and the stratosphere. Clear air turbulence (CAT) is also of importance from the point of view of safety and comfort of air travelers. There is significant temporal and spatial variability in the dissipation rate aloft, precluding the use of arbitrary constant values. A dearth of measurements contributes to a lack of knowledge about the characteristics of regions of intense small-scale mixing, which gives rise to questions regarding the role of this mixing in climate and weather prediction.

SUMMARY OF THE INVENTION

According to an example embodiment of the invention, there may be a method for determining turbulent mixing characteristics. The method may include obtaining sounding data associated with an atmospheric column, determining first vertical potential temperature profiles from the sounding data, determining second vertical profiles of displacement scales based at least in part on the first vertical potential temperature profiles, and determining turbulent mixing characteristics in the atmospheric column based at least in part on the displacement scales.

According to an aspect of the invention, the displacement scales may be Thorpe displacement scales and the second vertical profiles of the Thorpe displacement scales may be determined by sorting the first vertical potential temperature profiles. Additionally, the turbulent mixing characteristics may be determined based at least in part on the Thorpe displacement scales and real- or near-real time monitoring of turbulence in a troposphere/stratosphere of the atmospheric column by Doppler weather radars. According to another aspect of the invention, the sounding data may be obtained from one or more radiosondes or dropsondes. According to another aspect of the invention, the turbulent mixing characteristics include one or both of turbulent kinetic energy (TKE) dissipation rate or eddy diffusivity. The turbulent mixing characteristics may be determined in substantially real- or near-real time.

According to another aspect of the invention, the sounding data may be associated with one or more of radiosondes, rawinsondes, or dropsondes, wherein the sounding data may be operative to provide vertical resolution temperature and humidity profiles in the atmospheric column. The vertical resolution temperature and humidity profiles may be in the order of substantially 1 meter to 10 meters. The atmospsheric column may include at least one of the troposphere, the stratosphere, or the mesosphere (MST). One or both of the radiosondes and dropsondes, which may include or be associated with a vertical speed and temperature and humidity sensors, may be operable to provide around substantially 1-2 m resolution. The vertical speed may be an ascent speed or descent speed.

According to another aspect of the invention, the method may further include launching a plurality of radiosondes or dropsondes, where obtaining the sounding data may include receiving sonde data from the plurality of radiosondes or dropsondes. The plurality of radiosondes or dropsondes may be launched concurrently. According to another aspect of the invention, obtaining the sounding data may include computing ensemble averages of turbulence properties in the atmospheric column based upon the concurrently obtained sonde data. According to yet another aspect of the invention, the method may include utilizing the turbulent mixing characteristics for Numerical Weather Prediction and Climate models. For example, utilizing the turbulent mixing characteristics may include utilizing the determined turbulent mixing properties in the atmospheric column for Numerical Weather Prediction and Climate models through model skill assessment or assimilation. According to yet another aspect of the invention, the turbulent mixing characteristics are utilized by air transportation entities for determining air flight conditions. These air transportation entities may include airports, pilots, and air traffic controllers.

According to another embodiment of the invention, there may be a system. The system may include a memory for storing computer-executable instructions, and a processor in communication with the memory. The processor may be operative to execute the computer-executable instructions to receive sounding data associated with an atmospheric column, determine first vertical potential temperature profiles from the sounding data, determine second vertical profiles of displacement scales based at least in part on the first vertical potential temperature profiles, and determine turbulent mixing characteristics in the atmospheric column based at least in part on the displacement scales.

BRIEF DESCRIPTION OF THE DRAWINGS

Figure 1:
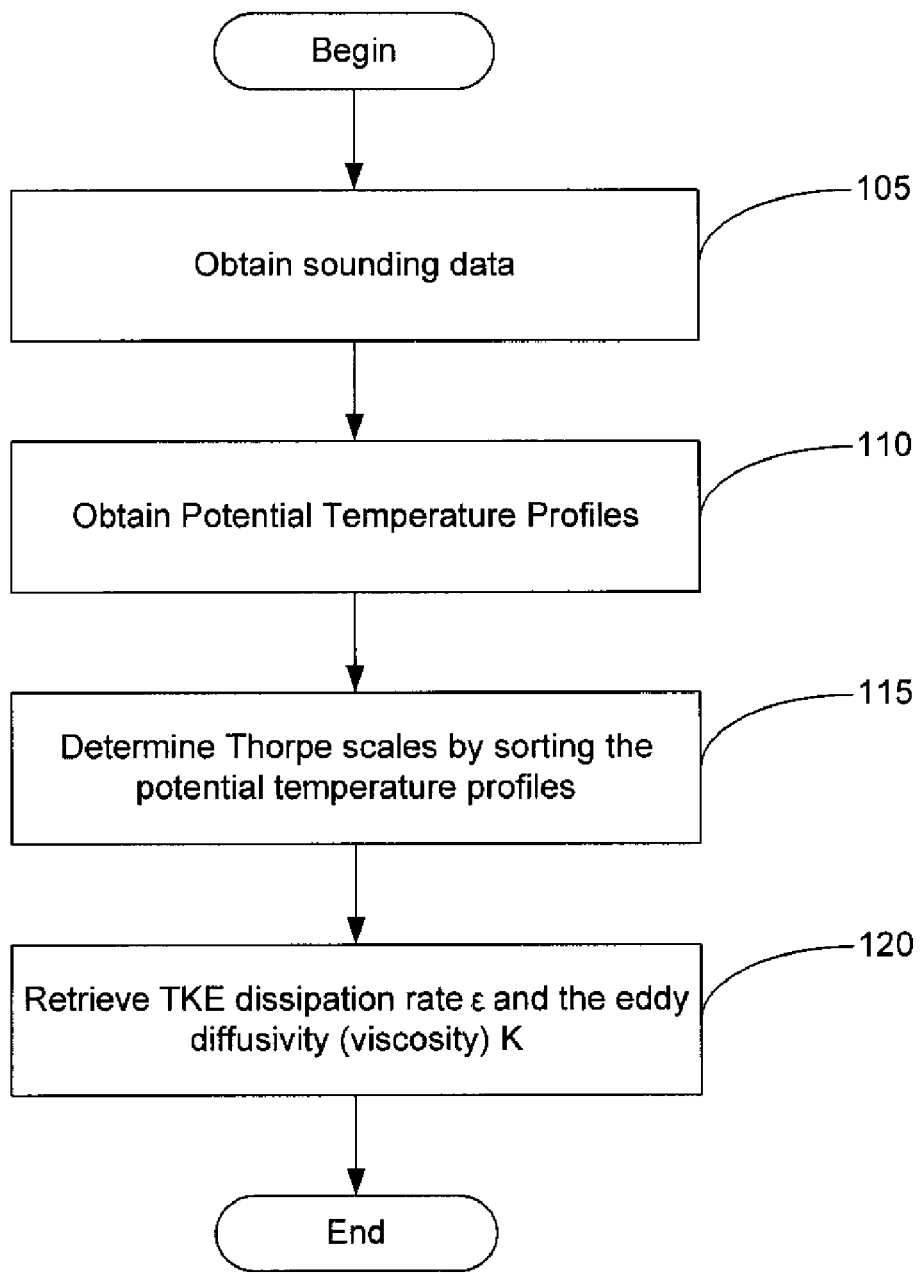

Having thus described the invention in general terms, reference will now be made to the accompanying drawings, which are not necessarily drawn to scale, and wherein:

FIG. 1 illustrates an example method for the determination of turbulent mixing characteristics in the atmosphere, according to an embodiment of the invention.

Figure 2:
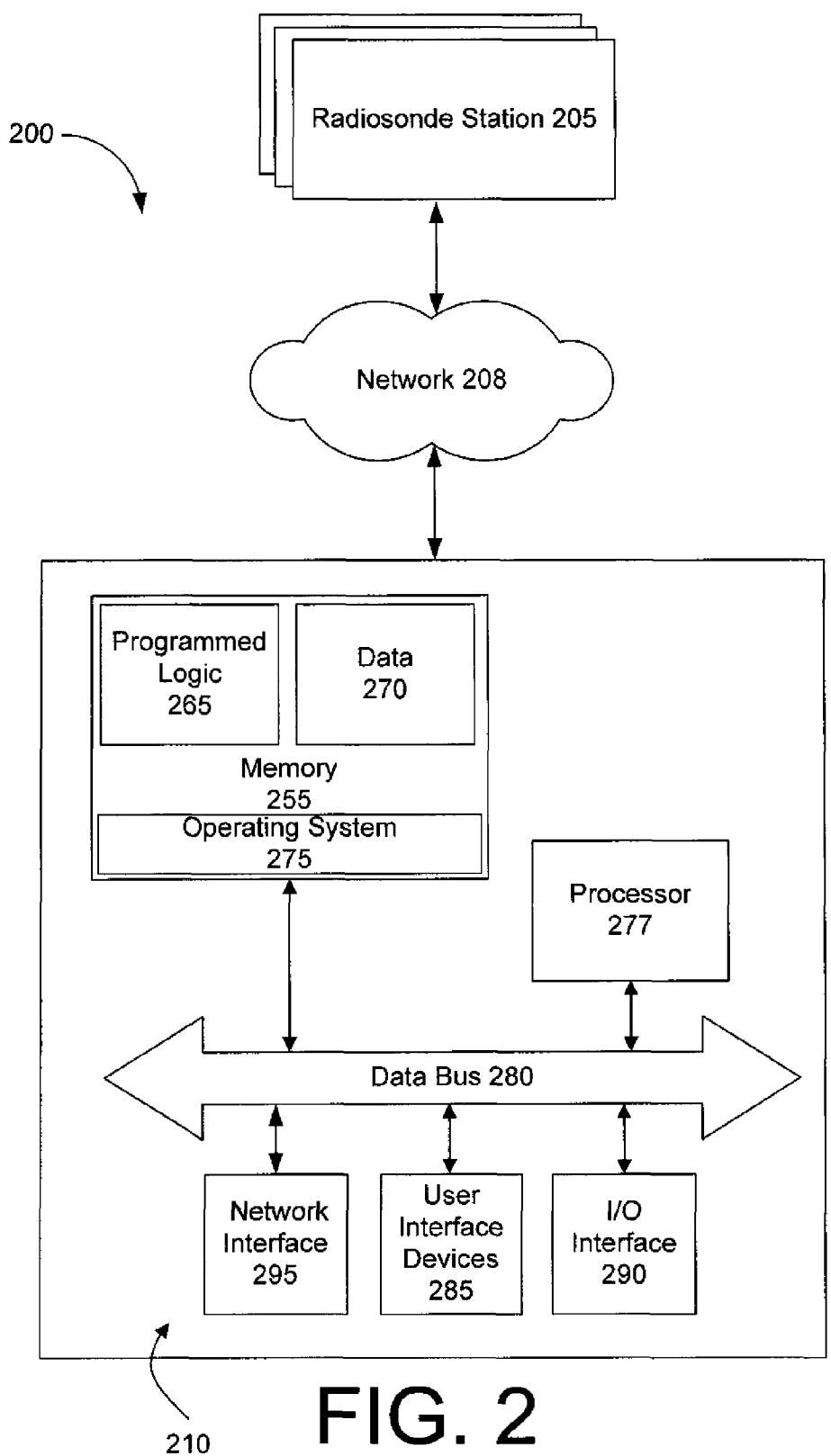

FIG. 2 illustrates an example system for implementing the method of FIG. 1, according to an example embodiment of the invention.

DETAILED DESCRIPTION OF THE INVENTION

Example embodiments of invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Example embodiments of the invention are described below with reference to block diagrams of systems, methods, apparatuses and computer program products according to one or more embodiments of the invention. It will be understood that each block of the block diagrams, and combinations of blocks in the block diagrams, respectively, can be implemented by computer program instructions. These computer program instructions may be loaded onto a general purpose computer, special purpose computer, or other programmable data processing apparatus to produce a machine, such that the combination of computing hardware and instructions which execute thereon constitute means for implementing the functionality of each block of the block diagrams, or combinations of blocks in the block diagrams discussed in detail in the descriptions below.

These computer program instructions may also be stored in a computer-readable memory to constitute an article of manufacture. The article of manufacture may be used in conjunction with a computing device to cause the instructions from the article of manufacture to be loaded onto and executed by the computing device, and thereby implement the function specified in the block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

Accordingly, blocks of the block diagrams support combinations of means for performing the specified functions, combinations of steps for performing the specified functions and program instruction means for performing the specified functions. It will also be understood that each block of the block diagrams, and combinations of blocks in the block diagrams, can be implemented by general or special purpose hardware-based computer systems that perform the specified functions or steps, or combinations of general or special purpose hardware and computer instructions.

Embodiments of the invention may be implemented through one or more application programs running on one or more operating systems of one or more computers. The inventions also may be practiced with diverse computer system configurations, including hand-held devices, multiprocessor systems, microprocessor based or programmable consumer electronics, mini-computers, mainframe computers, and the like.

Application programs may comprise components including modules, objects, data structures, and the like, that perform certain tasks or implement certain abstract data types. A particular application program (in whole or in part) may reside in a single or multiple memories. Likewise, a particular application program (in whole or in part) may execute on a single or multiple computers or computer processors. Example embodiments of the invention will hereinafter be described with reference to the figures, in which like numerals indicate like elements throughout the several drawings.

Embodiments of the invention may allow for the determination of turbulent mixing characteristics in an atmosphere. Generally, embodiments of the invention may provide for the determination of the turbulence kinetic energy (TKE) dissipation rate $\epsilon$ and the eddy diffusivity (viscosity) K from high-resolution sounding data such as from radiosondes or dropsondes or other means. The determination of the turbulence kinetic energy (TKE) dissipation rate K and the eddy diffusivity (viscosity) K may permit not only real-time or near real-time monitoring of turbulence in the free atmosphere, but also the exploration and determination of spatio-temporal characteristics based on databases or archives of resolution sounds. According to an example embodiment of the invention, these databases or archives of resolution sounds may include the extensive archive of high resolution soundings from around the world. Accordingly, embodiments of the invention may assist in predictions of weather, predictions for mixing of trace gases and pollutants in the atmosphere, numerical weather prediction (NWP) and climate models, as well as navigation of aircraft around potentially turbulent portions of the atmosphere. Other applications are also available without departing from example embodiments of the invention.

In accordance with an embodiment of the invention, turbulence scaling concepts may be utilized to determine the TKE dissipation rate $\epsilon$ and the eddy diffusivity (viscosity) K. Referring to FIG. 1, in step 105, high-resolution sounding data may be obtained. The sounding data may include radiosonde/rawinsonde/dropsonde soundings, which may be utilized to measure the temperature and/or humidity profiles in the atmosphere. According to an embodiment of the invention, radiosonde/rawinsonde soundings may be obtained from an extensive network of radiosonde stations around the globe. According to an embodiment of the invention, the stations may send up one or more radiosondes each day. For example, one or more stations may send up at least two (e.g., 00:00 and 12:00 UTC) and often four (e.g., 00:00, 06:00, 12:00, 18:00 UTC) radiosondes every day, perhaps even more during weather events. According to an embodiment of the invention, since the ascent rate of radiosondes may be about 5 m s$^{-1}$ on average, two-second data may provide a resolution of about 10 m, which may be sufficient in the troposphere. According to another embodiment of the invention, higher resolution radiosonde data, including half-second to one-second radiosonde data, may be obtained in the stratosphere corresponding to a resolution of 2.5 m to 5 m.

In step 110, the potential temperature profiles may be obtained from the high-resolution sounding data. In particular, the temperature and relative humidity (RH) may be used to determine the potential temperature at each level from standard thermodynamic equations, according to an example embodiment of the invention. Next, in step 115, the displacement/Thorpe scales, or an estimate thereof, may be determined by sorting the potential temperature profiles. More particularly, the potential temperature profiles may be sorted to yield a stable monotonic potential temperature profile, and hence the values of displacement d and N, as described herein, at each level. In alternative embodiments of the invention, other methods besides the Thorpe scales may be utilized to achieve the same objective. In step 120, the TKE dissipation rate E and the eddy diffusivity (viscosity) K may be determined based at least in part on the Thorpe scales.

TKE Dissipation Rate E and the Eddy Diffusivity (Viscosity) K

The calculation of the TKE dissipation rate $\epsilon$ and the eddy diffusivity (viscosity) K based on the displacement/Thorpe scales will now be discussed in further detail. The Thorpe scale may be a means or method of estimating the scale of the overturns from the potential temperature profile, according to an example embodiment of the invention. The method may involve rearranging the potential temperature profile into a monotonic profile that contains no inversions. For example, suppose a profile contains n samples of density and suppose the sample at depth $Z_n$ needs to be moved to a depth $Z_m$ in order to create a stable profile. The resulting displacement $d=|z_m-z_m|$ may be known as a Thorpe displacement (also referred to as a "displacement"), whose root mean square value may be referred to as the Thorpe scale $L_T$. According to an embodiment of the invention, it may be possible to estimate the displacement scale in the overturn/inversion regions using a routine to sort the high-resolution potential temperature profile from the sensors into a stable monotonic profile.

The Thorpe scale may be indicative of the local overturning scale in the atmospheric column. According to an embodiment of the invention, the Thorpe scale may be highly correlated with a length scale of turbulence of great importance in the stably stratified atmosphere—the Ozmidov scale $L_o=(\epsilon/N^3)^{1/2}$ (where N is the local buoyancy frequency), which may be indicative of the maximum turbulence length scale possible in a stably stratified atmosphere:

$$L_c = cL_T \quad (1)$$

In equation (1), c may be an empirical constant whose value may range from around 0.2 to around 0.8. The empirical constant c may be around 0.5, which may be further refined according to an embodiment of the invention.

Accordingly, it follows from the definition of the Ozmidov scale that:

$$\epsilon = C_K L_T^2 N^3 \quad (2)$$

where $C_K = c^2$. In accordance with an embodiment of the invention, an estimate of the Thorpe scale may provide a reliable means of inferring the TKE dissipation rate $\epsilon$, provided the background value of local N can also be estimated. According to an embodiment of the invention, the background value of local N can be estimated from the sorted potential temperature profile. Knowing $\epsilon$ and N, through assumption of local equilibrium and hence a balance between production and dissipation terms in the TKE equation, it may be possible to determine the turbulent (eddy) diffusivity (viscosity) K from $$K = \gamma \epsilon N^{-2} \quad (3)$$

where $\gamma = Ri_f/(1-Ri_f)$ is the mixing efficiency and $Ri_f$ is the flux Richardson number. According to an embodiment of the invention, using $Ri_f=0.2$ gives $\gamma=0.25$. Logistical considerations may dictate the use of a displacement scale instead of a Thorpe scale in Equation (2), according to an example embodiment of the invention.

System Overview

FIG. 2 is a system overview of a turbulence modeling system 200 in accordance with an embodiment of the invention. As shown in FIG. 2, the turbulence modeling system 200 may include one or more radiosonde stations 205 in communication with a control unit 210 via one or more networks 208. The network 208 may include a variety of wired and wireless networks, both private and public, including the Internet, a local area network, a metro area network, a wide area network, a public switched telephone network, or any combination thereof.

Each radiosonde station 205 may include software (e.g., applet, stand-alone software, a web client, Internet portal) to interface with the control unit 210. The radiosonde station 205 may be operable to provide single or multiple high-resolution radiosonde/rawinsonde/dropsonde soundings to the control unit 210. There control unit 210 may be utilized by a turbulence modeling system 200 for implementing all or portions of the method described in FIG. 2, according to one or more illustrative embodiments of the invention. The control unit 210 may include a memory 255 that stores programmed logic 265 (e.g., software) in accordance with an embodiment of the invention. The programmed logic 265 may include one or more modules for executing the method of FIG. 2, in accordance with embodiments of the invention.

The memory 255 may also include data 270 that may be utilized in the operation of the invention and an operating system 275. The data 270 may include high-resolution radiosonde/rawinsonde/dropsonde soundings. Other data, including parameters, necessary to support the method of FIG. 2 may also be stored in the data 270. A processor 277 may utilize the operating system 275 to execute the programmed logic 265, and in doing so, may also utilize (e.g., store, modify, and/or retrieve) the data 270.

A data bus 280 may provide communication between the memory 255 and the processor 277. Users may interface with the control unit 210 via a user interface device(s) 285 such as a keyboard, mouse, control panel, display, microphone, speaker, or any other devices capable of communicating information to or from the control unit 210. The control unit 210 may be in communication with other external devices via I/O Interface(s) 290, such as one or more printers, facsimiles, tape drives, disk drives, and other external storage devices. Additionally, the control unit 210 may include one or more network interface(s) 295 for communication with the network 200, including radiosonde station 205. Likewise, other network interface(s) 295 may provide communications with networks other than network 200. Further the control unit 210 and the programmed logic 265 implemented thereby may comprise software, hardware, firmware or any combination thereof. The control unit 210 may be a personal computer, mainframe computer, minicomputer, any other computer device, or any combination thereof without departing from embodiments of the invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for determining turbulent mixing characteristics, comprising:

obtaining sounding data associated with an atmospheric column via at least one radiosonde or dropsonde, the sounding data including at least temperature information for one or more levels of the atmospheric column;

determining first vertical potential temperature profiles for one or more levels of the atmospheric column from the sounding data that includes at least the temperature information;

sorting the first vertical potential temperature profiles to determine second vertical profiles of displacement scales, the displacement scales providing an estimate of overturn scales, wherein the displacement scales are Thorpe scales; and determining turbulent mixing characteristics in the atmospheric column based at least in part on a comparison of the displacement scales to an Ozmidov scale, the turbulent mixing characteristics including at least one of a turbulent kinetic energy (TKE) dissipation rate or eddy diffusivity, wherein the prior steps are performed by one or more computers associated with a turbulence modeling system.

2. The method of claim 1, wherein the sounding data is obtained in real- or near-real time.

3. The method of claim 1, wherein the sounding data is operative to provide vertical resolution temperature and humidity profiles in the atmospheric column.

4. The method of claim 3, wherein the vertical resolution temperature and humidity profiles are in the order of substantially 1 meter to 10 meters.

5. The method of claim 1, wherein the atmospheric column includes at least one of the troposphere, the stratosphere, or the mesosphere.

6. The method of claim 3, wherein the at least one radiosonde or dropsonde is associated with a vertical speed that is operable to provide around substantially 1-2 m resolution.

7. The method of claim 6, wherein vertical speed includes an ascent or descent speed.

8. The method of claim 1, wherein the sounding data is obtained from a plurality of radiosondes or dropsondes.

9. The method of claim 8, wherein the plurality of radiosondes or dropsondes are launched concurrently.

10. The method of claim 9, wherein obtaining the sounding data further includes computing ensemble averages of turbulence properties in the atmospheric column based upon the sounding data obtained from the concurrently launched radiosondes or dropsondes.

11. The method of claim 1, further comprising utilizing the turbulent mixing characteristics for at least one of Numerical Weather Prediction or Climate models, wherein the prior step is performed by one or more computers associated with a turbulence modeling system.

12. The method of claim 11, wherein utilizing the turbulent mixing characteristics includes utilizing the determined turbulent mixing properties in the atmospheric column for at least one of Numerical Weather Prediction or Climate models through model skill assessment or assimilation.

13. The method of claim 1, wherein the turbulent mixing characteristics are utilized by air transportation entities for determining air flight conditions.

14. The method of claim 13, wherein the air transportation entities include airports, pilots, and air traffic controllers.

15. The method of claim 1, wherein the at least one radiosonde or dropsonde includes a respective temperature sensor for determining temperature information, and a respective humidity sensor for determining humidity information.

16. A system, comprising:

a memory for storing computer-executable instructions; and a processor in communication with the memory, wherein the processor is operative to execute the computer-executable instructions to:

receive sounding data associated with an atmospheric column via at least one radiosonde or dropsonde, the sounding data including at least temperature information for one or more levels of the atmospheric column;

determine first vertical potential temperature profiles for one or more levels of the atmospheric column from the sounding data that includes at least the temperature information;

sort the first vertical potential temperature profiles to determine second vertical profiles of displacement scales, the displacement scales providing an estimate of overturn scales, wherein the displacement scales are Thorpe scales; and determine turbulent mixing characteristics in the atmospheric column based at least in part on a comparison of the displacement scales to an Ozmidov scale, the turbulent mixing characteristics including at least one of a turbulent kinetic energy (TKE) dissipation rate or eddy diffusivity.

17. The system of claim 16, wherein the sounding data is obtained in real- or near-real time.

18. The system of claim 16, wherein the sounding data is operative to provide vertical resolution temperature and humidity profiles in the atmospheric column.

19. The system of claim 16, wherein the sounding data is obtained from a plurality of radiosondes or dropsondes launched concurrently.

20. The system of claim 16, wherein obtaining the sounding data further includes computing ensemble averages of turbulence properties in the atmospheric column based upon the sounding data obtained from the concurrently launched radiosondes or dropsondes.

* * * * *